(12) United States Patent
Bregman et al.

(10) Patent No.: US 7,828,202 B2
(45) Date of Patent: Nov. 9, 2010

(54) SYSTEM AND METHOD FOR CONTROLLING THE TRANSPORT OF ARTICLES

(75) Inventors: Jay Philip Bregman, London (GB); Thomas Edward Michael Allason, Reading (GB); Andrea L. Attanasio, Castrovillari (IT); Gianluca Fiorita, Cosenza (IT); Gianpaolo Ghiani, Lecco (IT); Massimo Guccione, Rende (IT); Roberto Musmanno, Castrovillari (IT)

(73) Assignee: E-Courier (Belize), Inc., Belize (BZ)

( * ) Notice: Subject to any disclaimer, the term of this patent is extended or adjusted under 35 U.S.C. 154(b) by 1240 days.

(21) Appl. No.: 11/065,474

(22) Filed: Feb. 24, 2005

(65) Prior Publication Data
US 2006/0190360 A1  Aug. 24, 2006

(51) Int. Cl.
*G06F 7/00* (2006.01)
(52) U.S. Cl. .................. 235/376; 700/10; 709/203; 709/206
(58) Field of Classification Search ............ 705/28, 705/30; 235/375, 376, 383, 385; 700/100, 700/102; 707/10, 100, 102, 104.1, 944, 948, 707/949, 999.01, 999.1, 999.102, 999.107; 709/217, 223, 202, 203, 206, 209, 219; 718/102, 718/103; 340/988–994
See application file for complete search history.

(56) References Cited

U.S. PATENT DOCUMENTS

| | | | |
|---|---|---|---|
| 5,122,959 A * | 6/1992 | Nathanson et al. .......... 701/117 |
| 5,532,702 A | 7/1996 | Mintz | |
| 5,542,237 A * | 8/1996 | Grey et al. .................... 53/472 |
| 5,636,122 A | 6/1997 | Shah et al. | |
| 5,754,857 A * | 5/1998 | Gadol ........................ 709/203 |
| 5,794,414 A * | 8/1998 | Grey et al. .................... 53/472 |
| 5,812,959 A | 9/1998 | Froeburg et al. | |
| 5,884,216 A | 3/1999 | Shah et al. | |
| 5,918,214 A * | 6/1999 | Perkowski ................... 705/27 |
| 5,922,040 A | 7/1999 | Prabhakaran | |

(Continued)

FOREIGN PATENT DOCUMENTS

DE  19925524 A1  12/2000

(Continued)

OTHER PUBLICATIONS

PCT International Search Report Issued Aug. 13, 2008.

(Continued)

*Primary Examiner*—Andrew Joseph Rudy
(74) *Attorney, Agent, or Firm*—Summa, Additon & Ashe, P.A.

(57) ABSTRACT

A system and method for controlling the transport of articles comprises in one embodiment one or more communication devices for receiving and transmitting data, at least one primary server in communication with the primary server for allocating couriers for the collection and delivery of articles, a program for controlling the server, and at least one remote interface for placing orders for the collection and delivery of the articles, wherein the program, upon the execution of an order, compares stored historical travel times from one geographic location to another with actual travel times from one geographic location to another to thereby provide updated estimates for the collection time and delivery time of articles provided in subsequent orders.

27 Claims, 1 Drawing Sheet

U.S. PATENT DOCUMENTS

| | | | |
|---|---|---|---|
| 5,946,375 A * | 8/1999 | Pattison et al. | 379/112.01 |
| 6,026,345 A | 2/2000 | Shah et al. | |
| 6,028,842 A * | 2/2000 | Chapman et al. | 370/235 |
| 6,050,490 A | 4/2000 | Leichner et al. | |
| 6,058,163 A * | 5/2000 | Pattison et al. | 379/265.06 |
| 6,088,648 A | 7/2000 | Shah et al. | |
| 6,115,641 A * | 9/2000 | Brown et al. | 700/102 |
| 6,226,561 B1 * | 5/2001 | Tamaki et al. | 700/100 |
| 6,233,517 B1 | 5/2001 | Froeberg | |
| 6,360,875 B1 * | 3/2002 | Altemus et al. | 198/499 |
| 6,401,078 B1 * | 6/2002 | Roberts et al. | 705/28 |
| 6,430,496 B1 * | 8/2002 | Smith et al. | 701/117 |
| 6,437,743 B1 | 8/2002 | Mintz et al. | |
| 6,496,775 B2 | 12/2002 | McDonald, Jr. et al. | |
| 6,519,625 B1 * | 2/2003 | Murrell et al. | 709/202 |
| 6,550,683 B1 | 4/2003 | Augustine | |
| 6,553,407 B1 * | 4/2003 | Ouchi | 709/206 |
| 6,606,557 B2 | 8/2003 | Kotzin | |
| 6,615,046 B1 | 9/2003 | Ur | |
| 6,625,539 B1 | 9/2003 | Kittell et al. | |
| 6,734,823 B2 | 5/2004 | Mintz et al. | |
| 6,741,927 B2 | 5/2004 | Jones | |
| 6,748,318 B1 | 6/2004 | Jones | |
| 6,763,299 B2 | 7/2004 | Jones | |
| 6,763,300 B2 | 7/2004 | Jones | |
| 6,882,269 B2 * | 4/2005 | Moreno | 340/5.73 |
| 6,898,621 B2 * | 5/2005 | Kuriki et al. | 709/206 |
| 6,940,832 B2 * | 9/2005 | Saadawi et al. | 370/328 |
| 6,957,247 B1 * | 10/2005 | Ates | 709/203 |
| 6,993,763 B2 * | 1/2006 | Hayes, Jr. | 718/102 |
| 7,035,731 B2 * | 4/2006 | Smith | 701/207 |
| 7,119,976 B2 * | 10/2006 | Biskeborn et al. | 360/53 |
| 7,177,825 B1 * | 2/2007 | Borders et al. | 705/26 |
| 7,251,612 B1 * | 7/2007 | Parker et al. | 705/9 |
| 7,467,095 B2 * | 12/2008 | Ouimet | 705/7 |
| 7,479,899 B2 * | 1/2009 | Horstemeyer | 340/994 |
| 7,479,900 B2 * | 1/2009 | Horstemeyer | 340/994 |
| 7,587,327 B2 * | 9/2009 | Jacobs et al. | 705/8 |
| 2001/0047285 A1 | 11/2001 | Borders et al. | |
| 2002/0077750 A1 | 6/2002 | McDonald, Jr. et al. | |
| 2002/0093673 A1 | 7/2002 | Safra et al. | |
| 2002/0188702 A1 | 12/2002 | Short, III et al. | |
| 2003/0001779 A1 | 1/2003 | Mintz et al. | |
| 2003/0109985 A1 | 6/2003 | Kotzin | |
| 2004/0030572 A1 | 2/2004 | Campbell et al. | |
| 2004/0039527 A1 | 2/2004 | McDonald, Jr. et al. | |
| 2004/0066329 A1 | 4/2004 | Zeitfuss et al. | |
| 2004/0078141 A1 | 4/2004 | Kittell et al. | |
| 2004/0243430 A1 | 12/2004 | Horstemeyer | |

FOREIGN PATENT DOCUMENTS

| | | |
|---|---|---|
| DE | 10353404 A1 | 5/2004 |
| WO | WO 0068859 A2 | 11/2000 |
| WO | WO 01/69463 A1 | 9/2001 |

OTHER PUBLICATIONS

Supplemental European Search Report completed Jun. 10, 2010.
Mark C D et al: "Predicting Experienced Travel Time with Neural Networks: A Paramics Simulation Study", Intelligent Transportation Systems, 2004. Proceedings. The 7th International IEEE Conference on Washington, DC, USA, Oct. 3-6, 2004, Piscataway, NJ, USA, IEE-LNKD-D0I:10.1109/ITSC.2004.1399025, Oct. 3, 2004, pp. 906-911, XP010772210, ISBN:978-0-7803-8500-9.

* cited by examiner

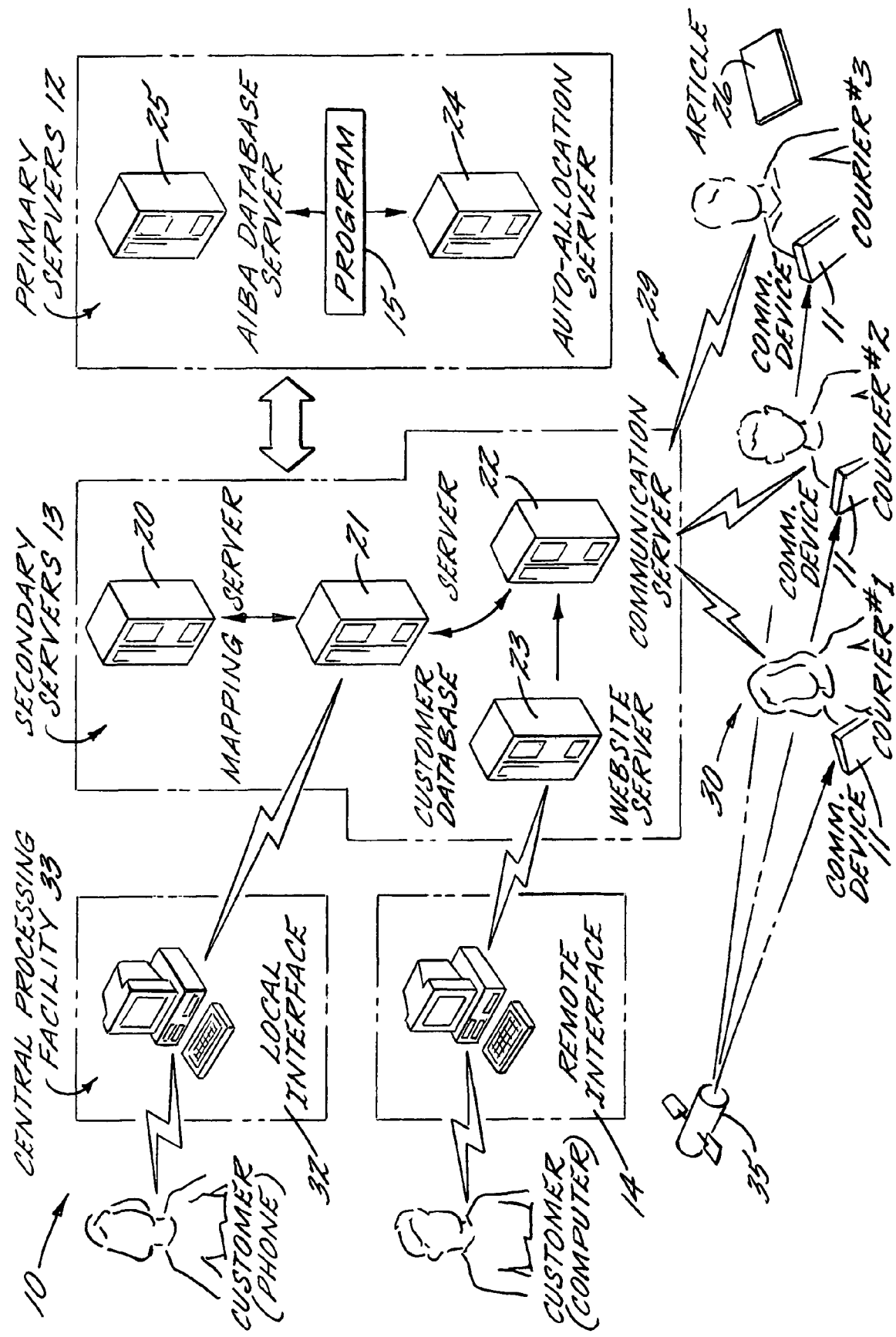

SYSTEM AND METHOD FOR CONTROLLING THE TRANSPORT OF ARTICLES

FIELD OF THE INVENTION

The invention relates to a system for allocating transportation assets for the collection and delivery of articles. In particular, the invention relates to a system for controlling the transport of articles. The invention also relates to a method of controlling the transport of articles.

BACKGROUND OF THE INVENTION

The transport of articles from one location to another geographically separated location is typically conducted by vehicles, railroad, and aircraft. Within metropolitan areas of substantial size, the transport of articles is more often conducted by vehicles such as cars, trucks, scooters, motorcycles, and bicycles. More specifically, the transport of articles for same-day on-demand collection (i.e., pick-up) and delivery within large cities requires a variety of mobile units in communication with a central processing or control facility.

Known transportation providers (e.g., FedEx and UPS) handling local deliveries, non-local deliveries, scheduled deliveries, and routed deliveries rely primarily upon vehicles to deliver articles within metropolitan areas. Most of these transportation providers, however, do not serve customers seeking same-day on-demand delivery. Stated differently, the traditional large transportation providers cater to the overnight and routine scheduled deliveries. Thus, there is a need for a system for controlling the transport of articles that serves customers requiring same-day on-demand services. Stated differently, there is a need for a system for controlling the collection and delivery of articles on the same day as the order is requested.

Traditional courier companies gain a slight competitive advantage based upon economies of scale. Servicing large clients, however, necessitates competition for tenders and subsequent discounts to the contracted firms. Further, an upper limit on the number of couriers and customers still exists that even the largest companies cannot support due to the reliance on human controllers to allocate incoming jobs to suitable couriers. The present invention permits a user to multiply the economies of scale associated with larger courier companies while attracting and servicing clients falling across the size spectrum, including personal users who will be able to pay for individual deliveries by credit card without the need for an established account.

Known courier systems may consider predetermined or historical routes (e.g., shortest distance between two points) when allocating jobs, but fail to consider variables that may expedite or delay the execution (i.e., completion) of an order. Thus, there is a need for a control system that compares historical travel times with actual travel times and updates the travel times to more accurately predict the expected collection and delivery of articles.

Advantageously, the present invention incorporates heuristic techniques in the selection and control of couriers. It will be understood by those skilled in the art that the term "heuristic" used in connection with "techniques" refers to methods that serve as an aid to learning, discovery, or problem-solving by experimental and especially trial-and-error methods. Stated differently, heuristic techniques relates to exploratory problem-solving techniques that utilize self-education (e.g., the evaluation of feedback) to improve performance. Heuristic techniques are also commonly associated with adaptive learning.

Further, the term "metaheuristics" refers to tools that allow computers to choose the most appropriate candidate from a variety of options in real-time. It will also be understood that metaheuristics refers to a high-level algorithmic framework or approach that can be specialized to solve optimization problems in the search for feasible solutions. In other words, metaheuristics are a class of approximate methods designed to solve difficult combinatorial optimization problems where classical heuristics have failed to be efficient and effective. In brief, those skilled in the art will understand that the terms heuristics and metaheuristics refers to methodological approaches used to address combinatorial optimization formulations. Specifically, the present invention provides a server having a metaheuristic computer program.

As compared to known courier systems reliant upon human controllers, a more desirable option is to provide a system for controlling the transport of articles having a server in communication with a plurality of mobile communication devices in the possession of couriers. Even more desirable is a system wherein the server is capable of identifying the most suitable courier, transmitting order information, analyzing historical route data and updating route information to thereby minimize delivery time and more accurately predict the collection and delivery times of articles.

OBJECT AND SUMMARY OF THE INVENTION

It is therefore an object of the present invention to provide a system for controlling the transport of articles that provides same-day on-demand delivery.

A further object of the invention is to provide a method for controlling the transport of articles that compares historical travel times with actual travel times and updates the travel times to more accurately predict the expected collection and delivery of articles.

The invention meets these objectives with a system for controlling the allocation and transport of articles that is capable of tracking couriers, allocating orders to the most suitable courier, monitoring the collection and delivery of articles, and analyzing historical data and current delivery data to thereby increase efficiencies. In particular, the invention is a system having a plurality of communication devices, a processing facility for managing orders, and a server capable of adaptive learning. In another aspect, the invention is a method for controlling the transport of articles that incorporates the system wherein a primary server identifies a suitable courier based on a plurality of variables, communicates the order information to an accepting courier, and then monitors the progress of the delivery.

Advantageously, the job or order allocation system operated by the present invention improves courier efficiency, allowing more jobs per day versus existing radio- and human-controlled systems, while reducing the overhead associated with conventional courier management.

The foregoing and other objects and advantages of the invention and the manner in which the same are accomplished will become clearer based on the following detailed description taken in conjunction with the accompanying drawings in which:

BRIEF DESCRIPTION OF THE DRAWINGS

FIG. 1 is a diagrammatical view of a preferred embodiment of the invention.

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

An overall view of the system 10 which incorporates features of the present invention is set forth in FIG. 1. In one embodiment the system 10 for controlling the transport of articles 26 for delivery comprises one or more communication devices 11 for receiving and transmitting data, at least one primary server 12 in communication with the communication devices, one or more secondary servers 13 in communication with the primary servers and the communication devices, and at least one remote interface 14 for placing orders for the collection and delivery of a plurality of articles. One of the primary servers 12 includes a program 15 for controlling the servers. The secondary servers 13 may include a mapping server 20, a customer database server 21, a communication server 22, and a website server 23.

In a preferred embodiment, the invention includes two primary servers 12. One of the primary servers will be referred to as the auto-allocation server 24 and the other will be referred to as the advanced information-based allocation (AIBA) database server 25. The auto-allocation server 24 operates with the program 15 and the AIBA database server 25 to automatically allocate orders to suitable couriers 30 for acceptance or rejection.

The AIBA database server 25 stores data related to historical travel time from one geographic location to another. The AIBA database server 25 operates in conjunction with the auto-allocation server 24 to allocate courier jobs by means of a computer algorithm according to courier location and suitability.

As recited above, one of the primary servers 12—and specifically the auto-allocation server 24—includes a program 15 for controlling the primary servers. Specifically, the program 15 is operative with both primary servers 12 to select a suitable courier 30 for a given order based upon a plurality of variables. As discussed more fully herein, the program 15 operating the auto-allocation server 24 includes an auto-allocation algorithm that analyzes the geographic location of couriers 30. The geographic locations are communicated from the communication devices 11 in possession of the couriers 30 to the auto-allocation server 24. The program 15 considers new orders input via a remote interface 14 (e.g., computer terminal) and then considers a plurality of variables to select the most appropriate courier 30 for a given order. Stated differently, the program 15 of the present invention is operative with the primary servers 12 to select a suitable courier 30 for a given order based upon a plurality of variables.

In a preferred embodiment, the plurality of variables upon which the program 15 bases the selection of a suitable courier 30 comprises the geographic location of the couriers, historical travel times from one geographic location to another, historical delivery performance of the couriers, environmental conditions, courier vehicle types, geographic locations of the origin of an article (i.e., collection point), geographic locations of the destination of an article (i.e., delivery point), requested delivery time, and type of article for delivery (e.g., envelope, box, etc.). The environmental conditions include traffic and weather conditions affecting potential routes for the courier. Advantageously, in a preferred embodiment, the program 15 permits the updating of traffic conditions every several minutes and the updating of weather conditions every hour.

Upon selection and acceptance by a courier 30, one of the secondary servers 13 (i.e., the communication server 22) transmits the order to the communication device 11 in the possession of the selected courier. The process mimics the actions of a human controller, but with a greater degree of precision provided by exact location information of couriers 30 and the ability to consider more information than can be processed by human controllers. The program 15 operates to dynamically allocate orders as the orders are booked. The program 15, and more specifically the auto-allocation algorithm, incorporates advanced scheduling techniques known as metaheuristics as discussed above. The program 15 also provides the ability to automatically reposition a fleet of couriers 30 in a predetermined geographic area in accordance with predicted demand by sending messages from the primary servers 12 to courier units via one or more secondary servers 13 (i.e., the communication server 11 and the customer database server 21), thus decreasing response times to customer orders.

The AIBA database 25 server also hosts a neural network 31 that operates with the program 15 to accomplish adaptive learning during the selection of a suitable courier 30. As used herein, the term "neural network" 31 refers to a computer architecture in which a number of processors are interconnected in a manner suggestive of the connections between neurons in a human brain and which is able to learn by a process of trial and error.

For example, upon the execution of an order, the program 15 compares historical travel times from one geographic location to another with actual travel times collected. The historical travel times are stored on one of the primary servers 12 (e.g., the AIBA database server 25). The actual travel times are collected and stored on at least one of the secondary servers 13 (e.g., customer database server 21) as well as on the AIBA database server 25. Subsequently, the program 15 updates the stored historical travel times to reflect variations between the historical travel times and the actual travel times. By doing so, the present invention provides more accurate estimates for the collection time and delivery time of articles 26 provided in subsequent orders.

A preferred embodiment of the present invention also includes one or more secondary servers 13 in communication with the primary servers 12 and communication devices 11. The mapping server 20 generates map displays accessible to employees and customers over a network (e.g., the Internet). The mapping server 20 also generates cost estimates for delivering articles 26 from one geographic location to another. The mapping server 20 is in communication with the customer database server 21 and local interfaces 32 (i.e., computer terminals) provided in a central processing facility 33 that controls the system 10.

The customer database server 21 stores orders placed by customers over a network (e.g., the Internet). The customer database server 21 is in communication with the mapping server 20, the local interfaces 32 in the central processing facility 33, the communication server 22, the host server for the website 23, and the primary servers 24, 25. The customer database server 21 also generates information regarding the status of one or more orders. The status information is accessible by a user over a network such as the Internet. Furthermore, the customer database server 21 stores actual travel times of couriers 30 from one geographic location to another.

Accordingly, a customer can monitor the status of an order by logging onto a website hosted by one of the secondary servers 13. In like fashion, employees maintaining the system 10 can monitor the status of orders on the local interfaces 32 positioned in the central processing facility 33. The status information comprises estimated time for collection of an article 26, estimated time for delivery of the article, geographic location of the origin of the article (i.e., collection point), geographic location of the destination of the article (i.e., delivery point), and the current geographic location of communication devices 11 in possession of the couriers 30.

The customer database server 21 also generates a display depicting the current geographic location and status of the couriers 30. The display is accessible to employees and customers via a network such as the Internet.

The communication server 22 facilitates communication between the remote interfaces 14 (i.e., computer terminals used by customers) and the primary servers 12 via at least one of the secondary servers 13 (e.g., customer database server 21). The communication server further facilitates communication between the primary servers 12 and the mobile communication devices 11 in possession of the couriers 30. In one embodiment of the invention, the communication server 22 hosts a website that permits customers to place orders over the Internet and track the status of their orders.

In an alternative embodiment, the invention includes a dedicated secondary server 13 to host the website. The website allows customers to interact directly with the secondary servers 13 without using customer service representatives (i.e., employees) as intermediaries. Advantageously, customers can track an article 26 moving in real-time from one geographic location to another upon placing an order, thus providing unprecedented oversight of secure deliveries. Furthermore, the present invention provides highly accurate and constantly-updated delivery time estimates that are displayed on the website. Upon delivery, the name of the signor and signature is displayed on the website as a graphical file, complete with the time and date of delivery, as well as a link to a map which indicates the location at which the signature was taken. The present invention also notifies customers of the execution of an order via electronic mail, Short Message Service (SMS), or facsimile. Further, the present invention allows customers to manage their account, access past orders, and utilize relevant billing tools. Customers can view and sort their past orders online and download the orders to software programs (e.g., Sage or Excel software programs) for auditing purposes. In summary, the status information as discussed herein includes full line-by-line information for each order and executed signature to confirm proof of delivery.

The communication devices 11 are preferably mobile and in the possession of one or more of the couriers 30. The communication devices 11 are capable of transmitting and receiving voice information as well as electronic information (i.e., data). In a preferred embodiment, the communication devices 11 transmit and receive voice and data via the General Packet Radio Service (GPRS).

In one embodiment, the communication device 11 is a XDA 2 (i.e., a small handheld personal computer) configured to withstand rugged handling and marketed by the company O2. In a preferred embodiment, the communication device 11 includes the Microsoft PocketPC 2003 operating system. This operating system enables the use of customized wireless applications and provides Global System for Mobile Communications (GSM) and GPRS service on the O2 network. Advantageously, the O2 network provides a dedicated voice and data channel, thereby reducing bandwidth congestion.

The communication devices 11 are capable of communicating with a global positioning network 35 to provide geographical coordinates (i.e., location) of the device. For example, the communication devices 11 communicate with the network system known as Global Positioning System (GPS) to provide geographical information. Further, the communication devices 11 are configured to transmit their present geographic location to the primary servers 12 via one or more of the secondary servers 13 over a network. Preferably the geographic locations are transmitted over the GPRS network.

The present invention may also include a central processing facility 33 having a plurality of local interfaces 32 permitting employees to communicate with the primary and secondary servers 12,13. Specifically, the central processing facility 33 permits employees to input orders, track the status of couriers, track the status of deliveries, and maintain the primary and secondary servers 12,13. The processing facility 33 may be collocated with the servers 12,13 or positioned remotely from the servers. The local interfaces 32 operated by the employees include booking software to assist in operations. In a preferred embodiment, the booking software is modified DA Systems Advanced Courier Interface Windows software. This preferred software promotes direct interaction with the software contained in the communication devices 11. The booking software is also linked to the customer database server 21, and the primary servers 12. The booking software and customer database may also incorporate reporting software (e.g., software sold under the name Crystal Reports) to create customised invoices and reports for customers, wherein the reporting technology allows customers to download their order history into their preferred accounting format (e.g., Sage and Excel software programs). The above-referenced information is available to customers from the website, by phone, or via paper invoicing.

The local interfaces 32 in the central processing facility 33 permit employees to accept verbal orders and input the orders into at least one of the secondary servers 13 (e.g., customer database server 21). Accordingly, in one embodiment, the remote interfaces 14 may include a telephone for communicating an order to the central processing facility 33.

In another embodiment, the remote interface 14 is a computer terminal in communication with at least one of the secondary servers 13. In this embodiment, a user may input an order directly from, for example, a remote computer terminal, and the order is directly input into at least one of the secondary servers 13 (e.g., customer database server 21) via the communication server 22 or dedicated website server 23.

The communication devices 11 and primary servers 12 are in communication with one another and thus capable of exchanging one or more messages. Specifically, the messages are related to an order placed by a customer via telephone or a computer terminal. The first message is an offer of the order for acceptance by a courier 30 selected by the program 15. The first message is communicated from the primary servers 12 to the communication device 11 in possession of the selected courier 30 via one of the secondary servers 13. Specifically, the first message is electronically transmitted from the primary servers 12 to the selected courier's 30 communication device 11 via the communication server 22 and one or more of the secondary servers 13. In a preferred embodiment of the communication device 11, the device displays details of the order forwarded to the courier 30.

The second message is an acceptance or a rejection by the selected courier 30 of the order offer. The second message is communicated from the selected courier's 30 communication device 11 to one of the secondary servers 13. Specifically, the second message is electronically transmitted from the selected courier's 30 communication device 11 to the customer database server 21 via the communication server 22.

The third message includes order information necessary for the collection and delivery of the article 25. The third message is communicated from the customer database server 21 to the selected courier's 30 communication device 11. In particular, the third message is electronically transmitted from the customer database server 21 to the accepting courier's 30 communication device 11 via the communication server 22. Once accepted by the courier 30, the communication device 11 will display the full job details and a point-to-point map if required. The device 11 can also be used to display the courier's job history, location, and even personal accounting details.

A fourth message includes confirmation of collection (i.e., collection) of the article 26. The fourth message is communicated from the communication device 11 in possession of the accepting courier 30 to the primary servers 12 via one or more of the secondary servers 13. In particular, the courier 30 presses a button upon collection of the article 26 and the collection information is communicated to the primary servers 12.

A fifth message includes the time and date of delivery of the article 26. The fifth message is communicated from the communication device 11 in possession of the courier 30 to the primary servers 12 via one or more of the secondary servers 13. Specifically, upon arrival at the destination of the article 26, the courier 30 obtains the recipient's signature on the screen of the communication device 11. This procedure increases customer confidence and security while streamlining the allocation process and eliminating paperwork. As stated above, customers will have instant access to a digital graphic of the delivery confirmation signature from the website. Further, customers have the option of receiving electronic mail that includes the above-referenced delivery information.

In a preferred embodiment of the present invention, the messages are preferably transmitted via a wireless network between the communication server 21 and the communication devices 11. The messages may include data or voice transmissions.

In another aspect, the present invention provides for a method of controlling the transport of articles 26. The controlling method provides for the steps of collecting one or more orders for delivery of one or more articles 26, selecting a suitable courier 30 based upon a plurality of variables, and performing the delivery of the articles. The orders include an origin and a destination of the articles to be delivered. The selection of a suitable courier 30 is accomplished by at least one server having a program 15 for selecting couriers based on a plurality of variables. In a preferred embodiment, the selection is accomplished by the primary servers 12.

The step of collecting includes receiving an order from a remote location over a network. In one embodiment of the present method, a customer accesses the website from a remote interface 14 and places an order for a delivery. Specifically, the electronic order is transmitted from a computer terminal to the server. In another embodiment, a customer may use a telephone to contact the central processing facility 33 and place a verbal order over the public switched telephone network. Upon placing the verbal order, an employee in the central processing facility 33 will physically input the order into the primary servers 12 via a local interface 32 (i.e., computer terminal). Accordingly, the step of collecting also includes the step of inputting the origin and destination of one or more articles 26 into at least one of the secondary servers 13 and the primary servers 12.

Upon placement of an order, a suitable courier 30 is selected by first identifying the geographical locations of the communication devices 11 in possession of the couriers. Advantageously, the communication devices 11 are in communication with the primary servers 12. During the selection of a suitable courier 30, the geographical locations of the communication devices 11 are calculated by a global positioning network 35 (i.e., GPS). Next, the geographical locations of the communication devices 11 are communicated (i.e., transmitted) from the devices to the primary servers 12 via the communication server 22.

The plurality of variables upon which the program 15 bases the selection of a suitable courier 30 include the geographic location of the couriers, historical travel times from one geographic location to another, historical delivery performance of the couriers, environmental conditions, courier vehicle types, geographic locations of the origin of an article, geographic locations of the destination of an article 26, requested delivery time, and type of article for delivery.

The step of performing the delivery of the articles 26 includes exchanging one or more messages between the communication devices 11 and the primary server 12. The messages relate to an order placed by a customer. The first message is an offer of the order to a courier 30 selected by the primary server 12. The first message is communicated (i.e., electronically transmitted) from the primary servers 12 to the selected courier's communication device 11 via one or more secondary servers 13 (e.g., customer database server 21 and communication server 22).

The second message is an acceptance or a rejection of the offer of the order. The second message is electronically transmitted from the selected courier's communication device 11 to one of the secondary servers 13 via the communication server 22. Specifically, the second message is electronically transmitted from the selected courier's communication device 11 to the customer database server 21 via the communication server 22.

The third message includes information regarding the order that is necessary for the collection and delivery of the article 26. The third message is electronically transmitted from the customer database server 21 to the selected courier's communication device 11. In particular, the third message is electronically transmitted from the customer database server 21 to the accepting courier's communication device 11 via the communication server 22.

Upon forwarding the order information to the accepting courier 30, the present method further provides for the steps of collecting the article 26 to be delivered, and then exchanging one or more messages between the communication device 11 and the primary server 12. The messages include data related to the collection of an article 26. The first message includes the time and date of collection of the article 26 to be delivered. The first message is communicated from the selected courier's communication device 11 to the primary servers 12 via one or more secondary servers 13 (e.g., customer database server 21 and communication server 22).

Upon collection the article 26 to be delivered, the courier 30 delivers the article. Thereafter, one or more messages are exchanged between the communication device 11 and the primary servers 12. The messages relate to the delivery of an article 26. The first message includes the time and date of delivery of the article 26. The first message is communicated from the communication device 11 in possession of the selected courier 30 to the primary servers 12 via one or more secondary servers 13 (e.g., customer database server 21 and communication server 22).

Subsequently, the method provides for the step of informing customers of the estimated collection and delivery times of the articles 26. The customer may access the website via a local network (e.g., Internet) to view the estimated times.

Advantageously, the present method includes the step of repositioning couriers 30 to account for an increase in the number of orders in a particular geographic location. Specifically, the primary servers 12 and secondary servers 13 are capable of tracking the current demand for orders and the geographical position of the mobile communication devices 11 in possession of the couriers 30. Upon identifying a particular geographic area that is currently underserved, the primary and secondary servers 12,13 will communicate suggested locations for the couriers 30 to position themselves during idle time (i.e., between collections and deliveries).

Further, the method may provide for the communications server 22 and customer database server 21 to monitor the location of the couriers 30. In this fashion, the method permits employees and customers to track the status of orders.

The present invention dramatically increases the efficiency and productivity of a courier 30 by reducing idle-time and providing advanced, intelligent job consolidation. The invention allows real-time communication between couriers 30 on the street and employees in the central processing facility 33 without the inconvenience and expense associated with the traditional courier company infrastructure. The system further permits one to manage a large fleet of couriers 30 with minimal overhead. Specifically, the invention is designed to control more than 1,000 couriers.

In the drawings and specification, there have been disclosed typical embodiments on the invention and, although specific terms have been employed, they have been used in a generic and descriptive sense only and not for purposes of limitation, the scope of the invention being set forth in the following claims.

That which is claimed is:

1. A system for controlling the transport of articles, said control system comprising:
   one or more communication devices for receiving and transmitting data, said communication devices in the possession of one or more couriers;
   at least one primary server for allocating couriers for the collection and delivery of a plurality of articles, said primary server in communication with said communication devices, said primary server having a program for controlling said server;
   one or more secondary servers in communication with said primary server and said communication devices; and
   at least one remote interface for placing orders for the collection and delivery of a plurality of articles;
   wherein said program, upon the execution of an initial order and then a subsequent order, dynamically and automatically organizes routes and dynamically and automatically reroutes allocated couriers for the collection and delivery of said plurality of articles.

2. A transport control system according to claim 1, wherein said program operates with said primary server to select a suitable courier for a given order based upon a plurality of variables.

3. A transport control system according to claim 2, wherein at least one of said secondary servers directs an order to one of said communication devices in possession of the selected courier upon acceptance of the order by the selected courier.

4. A transport control system according to claim 1, wherein said communication devices transmit and receive voice and data information.

5. A transport control system according to claim 1, wherein said communication devices communicate with a global positioning network.

6. A transport control system according to claim 1, wherein said communication devices transmit present geographic location to said primary server over a network.

7. A transport control system according to claim 1, wherein said primary server stores data related to historical geographic location of the origin of said plurality of articles and historical geographic location of the destination of said plurality of said articles.

8. A transport control system according to claim 1, wherein said primary server hosts a neural network that operates with said program to accomplish adaptive learning during the selection of a suitable courier.

9. A transport control system according to claim 1, wherein said program:
   compares stored historical travel times from one geographic location to another with collected actual travel times upon execution of an order; and
   updates the stored historical travel times to reflect variations between the historical travel times and the actual travel times.

10. A transport control system according to claim 1, wherein at least one of said secondary servers generates cost estimates for delivering article from one geographic location to another.

11. A transport control system according to claim 1, wherein at least one of said secondary servers stores orders placed by customers.

12. A transport control system according to claim 1, wherein at least one of said secondary servers generates information regarding the status of one or more orders, said status information accessible by a user over a network.

13. A transport control system according to claim 1, wherein at least one of said secondary servers generates a display depicting the current geographic location and status of the couriers.

14. A transport control system according to claim 1, wherein at least one of said secondary servers facilitates communication between said primary server, said remote interface, and said mobile communication devices.

15. A transport control system according to claim 1, wherein at least one of said secondary servers hosts a website.

16. A transport control system according to claim 1, wherein said communication devices, said primary server, and said secondary servers exchange one or more messages, said messages being related to an order placed by a customer.

17. A transport control system according to claim 16, wherein a first of said one or more messages comprises an offer of the order for acceptance by a courier.

18. A transport control system according to claim 17, wherein said first message is communicated from said primary server to one of said communication devices.

19. A transport control system according to claim 16, wherein a second of said one or more messages comprises an acceptance or a rejection by a courier of the offer of the order.

20. A transport control system according to claim 19, wherein said second message is communicated from said communication device in possession of the courier to one of said secondary servers.

21. A transport control system according to claim 16, wherein a third of said one or more messages comprises order information necessary for the collection and delivery of the article.

22. A transport control system according to claim 21, wherein said third message is communicated from one of said secondary servers to one of said communication devices in possession of a courier.

23. A transport control system according to claim 16, wherein a fourth of said one or more messages comprises the time and date of collection of the article to be delivered.

24. A transport control system according to claim 23, wherein said fourth message is communicated from said communication device in possession of the courier to said primary server.

25. A transport control system according to claim 16, wherein a fifth of said one or more messages comprises the time and date of delivery of the article.

26. A transport control system according to claim 25, wherein said fifth message is communicated from said communication device in possession of the courier to said primary server.

27. A transport control system according to claim 1, further comprising a central processing facility having a plurality of local interfaces for communicating with said primary server.

* * * * *